United States Patent
Rainish

(10) Patent No.: US 12,425,078 B2
(45) Date of Patent: Sep. 23, 2025

(54) DIGITAL BEAM FORMING

(71) Applicant: SatixFy UK Limited, Farnborough (GB)

(72) Inventor: Doron Rainish, Farnborough (GB)

(73) Assignee: SatixFy UK Limited, Farnborough (GB)

( * ) Notice: Subject to any disclaimer, the term of this patent is extended or adjusted under 35 U.S.C. 154(b) by 150 days.

(21) Appl. No.: 18/454,101

(22) Filed: Aug. 23, 2023

(65) Prior Publication Data

US 2023/0396295 A1     Dec. 7, 2023

Related U.S. Application Data

(63) Continuation of application No. PCT/EP2022/054721, filed on Feb. 24, 2022.

(30) Foreign Application Priority Data

Feb. 24, 2021 (GB) .................................. 2102619

(51) Int. Cl.
    *H04B 7/0456*     (2017.01)

(52) U.S. Cl.
    CPC .................... *H04B 7/0456* (2013.01)

(58) Field of Classification Search
    CPC .. H04B 7/0456; H04B 7/0617; H04B 7/0842; H01Q 3/2682; H01Q 3/2694; H01Q 3/38
    See application file for complete search history.

(56) References Cited

U.S. PATENT DOCUMENTS

| | | | | |
|---|---|---|---|---|
| 5,075,679 | A | * 12/1991 | Gazsi | .................... H03M 3/488 |
| | | | | 341/143 |
| 10,374,730 | B2 | 8/2019 | Rainish et al. | |
| 2002/0041248 | A1* | 4/2002 | Galton | ................ H03M 1/0673 |
| | | | | 341/161 |
| 2008/0143572 | A1* | 6/2008 | Magrath | ............. H03M 1/0665 |
| | | | | 341/144 |
| 2022/0113941 | A1* | 4/2022 | Zhang | ..................... G06F 17/16 |

FOREIGN PATENT DOCUMENTS

WO    WO 2020/105040     5/2020

* cited by examiner

*Primary Examiner* — Khanh C Tran
(74) *Attorney, Agent, or Firm* — PEARL COHEN ZEDEK LATZER BARATZ LLP

(57) ABSTRACT

A digital beamforming circuit that includes a plurality of channels, each having an input port configured to receive a digital input signal and an output port configured to feed an antenna element with an analog signal, wherein the plurality of channels forms an electronically steerable antenna (ESA). Each channel includes: a comparator configured to compare the digital input signal with one of a plurality of thresholds that linearly span the digital input signal; a multi-level digital-to-analog converter (DAC) connected at an output of the comparator; and a delay line circuitry configured to apply a time delay to the channel, wherein the delay line circuitry of each channel is separately controlled to apply a respective time delay, collectively enabling to steer a beam of the PPA, wherein the digital beamforming circuit further includes a threshold permutation circuitry configured to periodically permutate the plurality of thresholds between the plurality of channels.

14 Claims, 12 Drawing Sheets

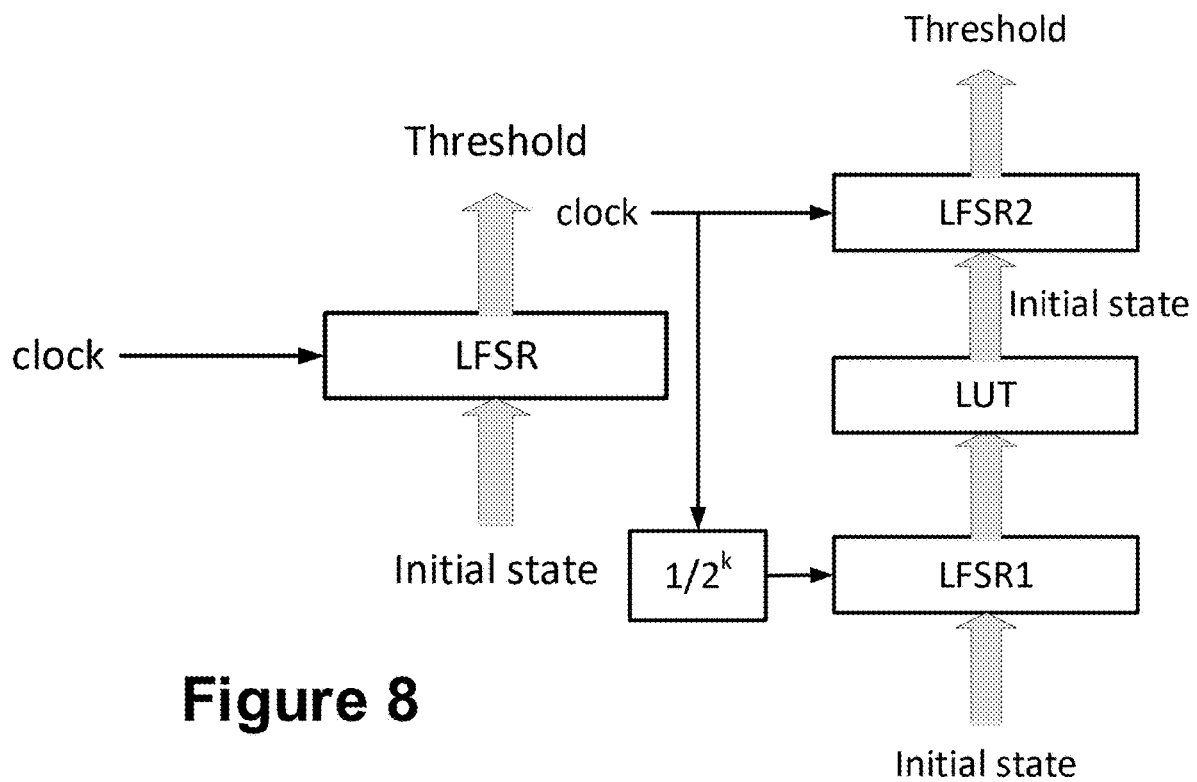
Figure 8
Figure 10
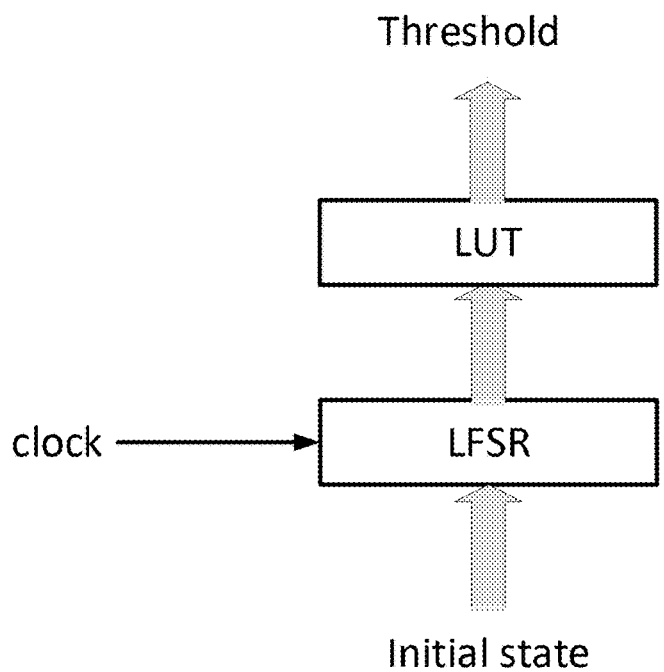
Figure 9

1200

DIGITAL BEAM FORMING

CROSS REFERENCE TO RELATED APPLICATIONS

This Application is a continuation of PCT Application No. PCT/EP2022/054721 filed on Feb. 24, 2022, which claims the priority of GB Patent Application No. GB2102619.0 filed on Feb. 24, 2021, both of which are incorporated herein by reference in their entirety.

FIELD OF THE INVENTION

The present invention relates generally to the field of beamforming, and more specifically digital beamforming in electronically steerable antennas (ESAs).

BACKGROUND OF THE INVENTION

Electronically steerable antennas (ESAs). offer many advantages including electronic beam steering and reduced power consumption and weight. True-time-delay (TTD) steering techniques are typically required for controlling operation of multiple antenna elements in the array, while keeping the broad bandwidth of the antenna radiation and allowing large scan angles, so that efficient elemental vector summation (in the receive mode) or distribution (in the transmit mode) can be obtained that is independent of frequency or angle.

Typical implementation of an electronically steerable antenna is based on analog radio frequency (RF) phase shifting (a special case known as Phased Array Antenna (PAA). Analog implementation suffers from several drawbacks: Due to implementation difficulties TTD is almost never implemented; Phase shifts are typically non-accurate due to production variations; and large antennas are difficult to implement due to the need of accurate and low lost routing.

Digital implementation of ESAs (either phased array or TTD) doesn't have the above drawbacks but typically consumes more power and may cost more than the analog implementation. The main reason is that in digital implementation, each antenna element signal is up converted to RF (in the transmit path) and down converted from RF (in the receive path) so that the signal processing (such as time delay, phase shift, beam combining etc.) can be digitally implemented in baseband or low IF.

There is a need in the art for a novel beam forming technique, which will have all the advantages of digital beam forming while its cost, and power consumption are less than those of analog beam forming.

SUMMARY OF THE INVENTION

In order to address the aforementioned technical challenge, some embodiments of the present invention provide a novel architecture for the transmit path of a digital beamformer, which reduces both the cost and the power of prior art digital implementation. According to the invention, the RF signal is sampled by a typically low-resolution digital to analog converter (DAC) and the rest of the signal processing is done digitally.

According to some embodiments of the present invention, a digital beamforming circuit is provided herein. The digital beamforming circuit may include a plurality of channels, each having an input port configured to receive a digital input signal and an output port configured to feed an antenna element with an analog signal, wherein the plurality of channels form an electronically steerable antenna (ESA). Each channel may include a comparator configured to compare the digital input signal with one of a plurality of thresholds that typically span the digital input signal but may span a part of it; an at least two-levels digital-to-analog converter (DAC) connected at an output of the comparator; and a delay line circuitry configured to apply a time delay to the channel, wherein the delay line circuitry of each channel is separately controlled to apply a respective time delay, collectively enabling to steer a beam of the ESA, wherein the digital beamforming circuit further includes a threshold permutation circuitry configured to periodically permutate the plurality of thresholds between the plurality of channels.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 8 illustrates a simple scheme to control threshold permutation in accordance with some embodiments of the present invention in accordance with some embodiments of the present invention;

FIG. 9 illustrates a scheme to control threshold permutations with a large permutation cycle in accordance with some embodiments of the present invention;

FIG. 10 illustrates an optional LUT for threshold setting flexibility in accordance with some embodiments of the present invention;

Figure 1:
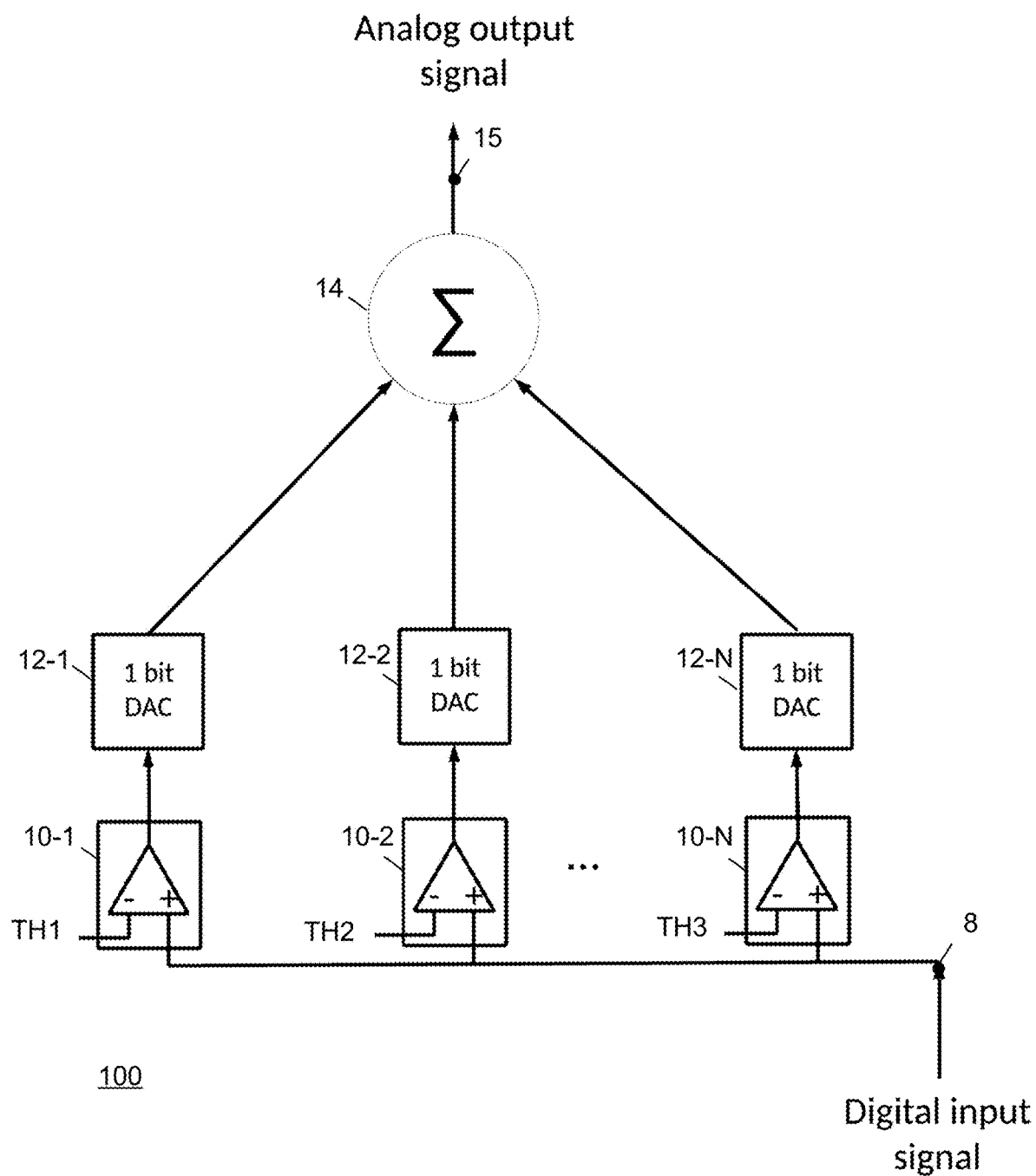
FIG. 1 illustrates a DAC architecture that is built using an array of distributed one bit DACs providing an explanation and background to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 illustrates a Digital to Analog Converter (DAC) architecture that is built using an array of distributed one bit DACs that serves as an explanation and an enabler accordance with some embodiments of the present invention. Circuit 100 includes a digital input port 8 through which a digital input signal is fed into N channels wherein each one of the channels has a comparator 10-1 to 10-N which receives respective one of thresholds $TH_1$-$TH_N$ as a second input. The outputs of comparators 10-1 to 10-N are fed into respective one bit DACs 12-1 to 12-N. The outputs of DACs 12-1 to 12-N are summed up by summation unit 14 such that at the analog port 15 of circuit 100 there is an analog output signal which is the analog conversion of the digital input signal of digital port 8.

The circuit of FIG. 1 can be viewed as an alternative or an equivalent implementation of a DAC when thresholds $TH_1$-$TH_N$ of the comparators linearly spread across the span of the input signal, the number of comparators that surpass the threshold value will be linearly proportional to the input signal level. As a result, the analog output signal level, which is the sum of the comparators outputs, will also be linearly proportional to the input signal level. It should be noted that any distribution of the thresholds is possible.

Figure 2:
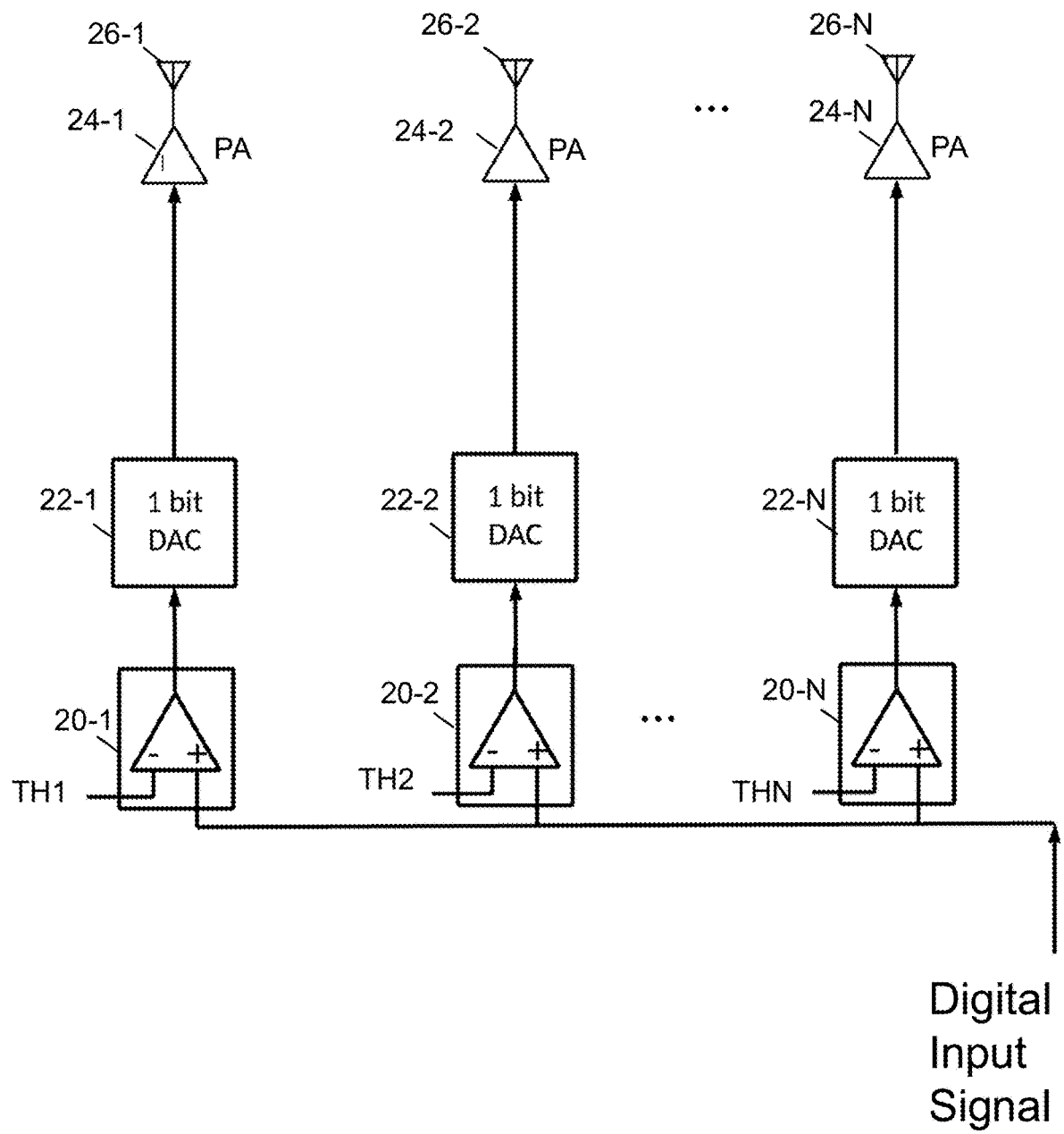
FIG. 2 illustrates the distributed DAC architecture as a base for an antenna array in accordance with some embodiments of the present invention.

Following from the above and as shown in FIG. 2, circuit 200 may function as an antenna array, where the signal is summed at the received antenna so summation circuit 14 is not needed.

Circuit 200 includes comparators 20-1 to 20-N feeding respective 1 bit DACs 22-1 to 22-N feeding in turn power amplifiers 24-1 to 24-N which feed antennas 26-1 to 26-N.

However, in order to resemble the circuit in FIG. 1 the signals from all the 1 bit DACs 22-1 to 22-N should arrive at the summation circuit, being the receiver antennas (not shown) at the same time. This can happen in the scheme described in FIG. 2 only if the received antenna is in front of the transmit antenna (boresight transmission).

Figure 3:
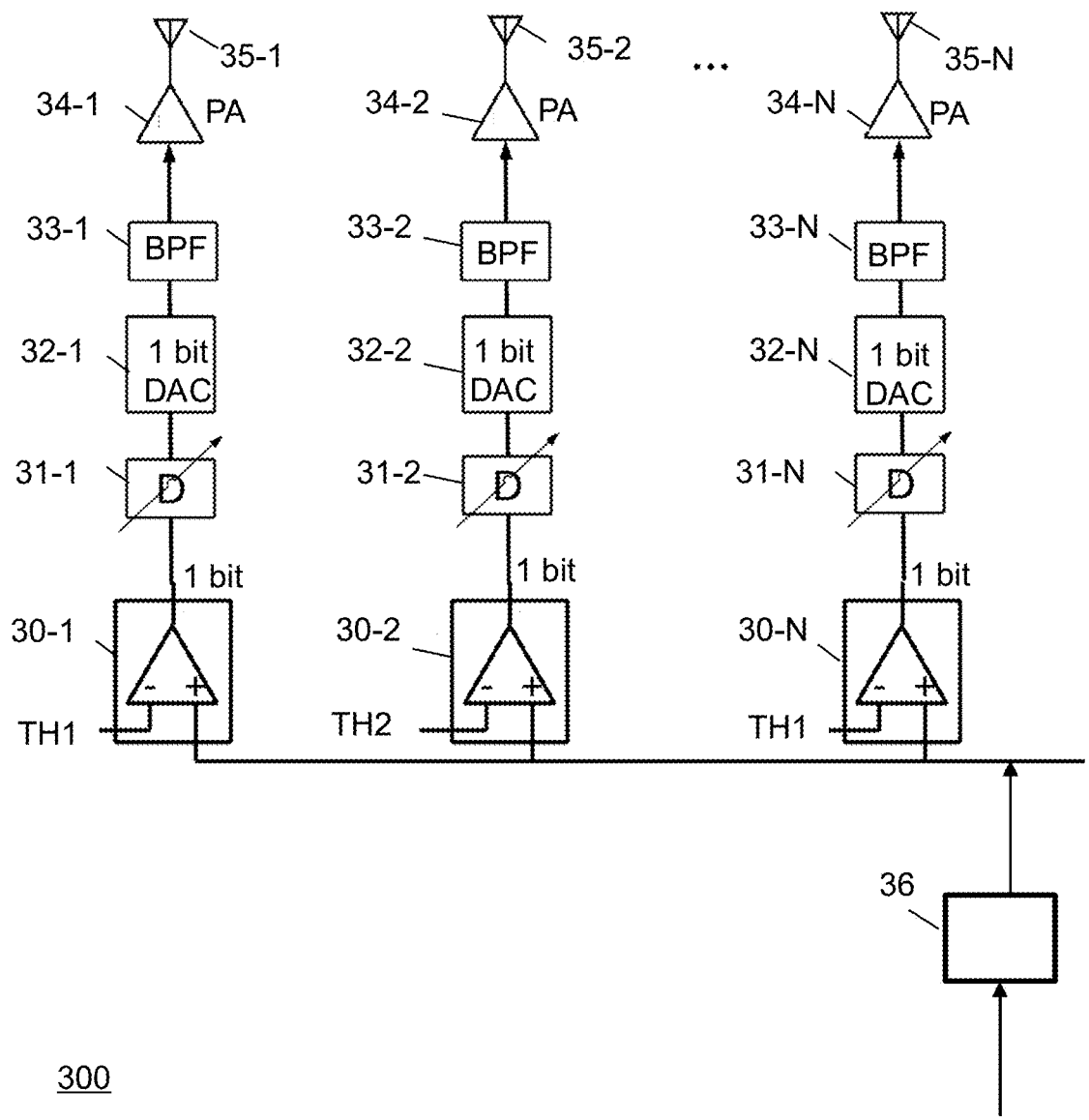
FIG. 3 illustrates the invention with one bit DAC per antenna element in accordance with some embodiments of the present invention.

FIG. 3 is a circuit diagram showing circuit 300 which serves as a digital beamforming circuit in accordance with some embodiments of the present invention. In order to steer the antenna, different delays should be applied to each antenna element as explained in detail below. Circuit 300 includes an upconverter 36 configured to upconvert a digital signal from a baseband to RF band. It is then fed into comparators 30-1 to 30-N having respective thresholds $TH_1$-$TH_N$. The outputs of comparators 30-1 to 30-N are fed into delay lines 31-1 to 31-N which are controlled independently in order to apply a different delay to each of the signals in the different channels controlling the respective antenna element. The outputs of delay lines 31-1 to 31-N are fed into respective 1 bit DACS 32-1 to 32-N whose analog outputs are feeding respective band pass filters BPFs 33-1 to 33-N which serve as a shaping filter to prevent sampling replicas from reaching power amplifiers 34-1 to 34-N before feeding antenna elements 35-1 to 35-N.

Figure 4:
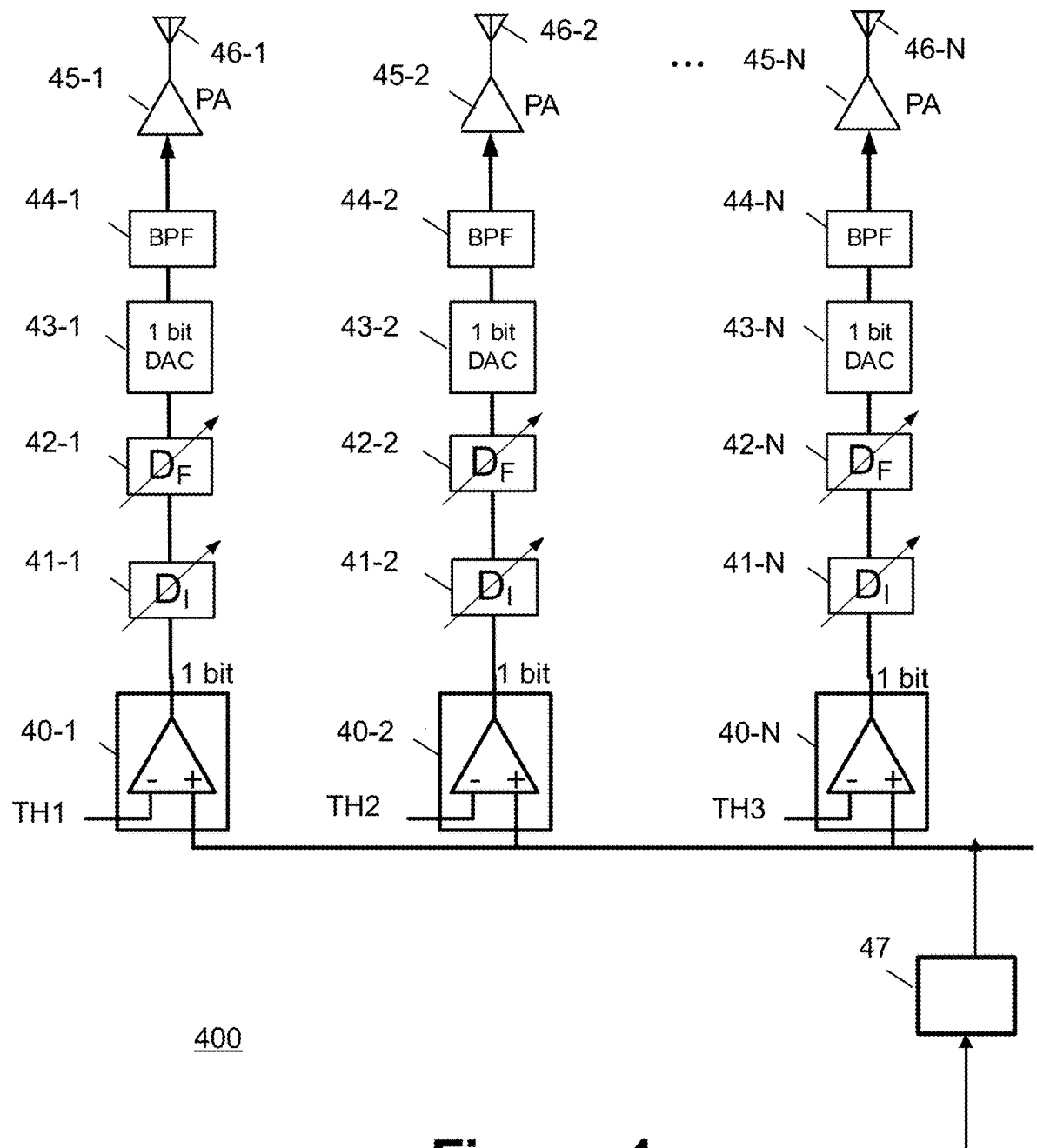
FIG. 4 illustrates the invention when the required delay is split to integer sample delay DI and a fraction sample delay DF in accordance with some embodiments of the present invention.

FIG. 4 is a circuit diagram showing circuit 400 which serves as a digital beamforming circuit in accordance with some embodiments of the present invention. In order to steer the antenna, different delays should be applied to each antenna element as explained in detail below. Circuit 400 includes an upconverter 47 configured to upconvert a digital signal from a baseband to RF band. It is then fed into comparators 40-1 to 40-N having respective thresholds $TH_1$-$TH_N$.

It is noted that the delay that is required for steering can be split to an integer sampling time part, and a sample time fraction, which is implemented here both in the digital domain. Thus, the outputs of comparators 40-1 to 40-N are fed into integer sample delay lines 41-1 to 41-N and then fraction delay lines 42-1 to 42-N which are controlled independently in order to apply a different delay to each of the signals in the different channels controlling the respective antenna element. The outputs of delay lines are fed into respective 1 bit DACs 43-1 to 43-N whose analog outputs are feeding respective band pass filters BPFs 44-1 to 44-N and then power amplifiers 45-1 to 45-N before feeding antenna elements 46-1 to 46-N.

Figure 5:
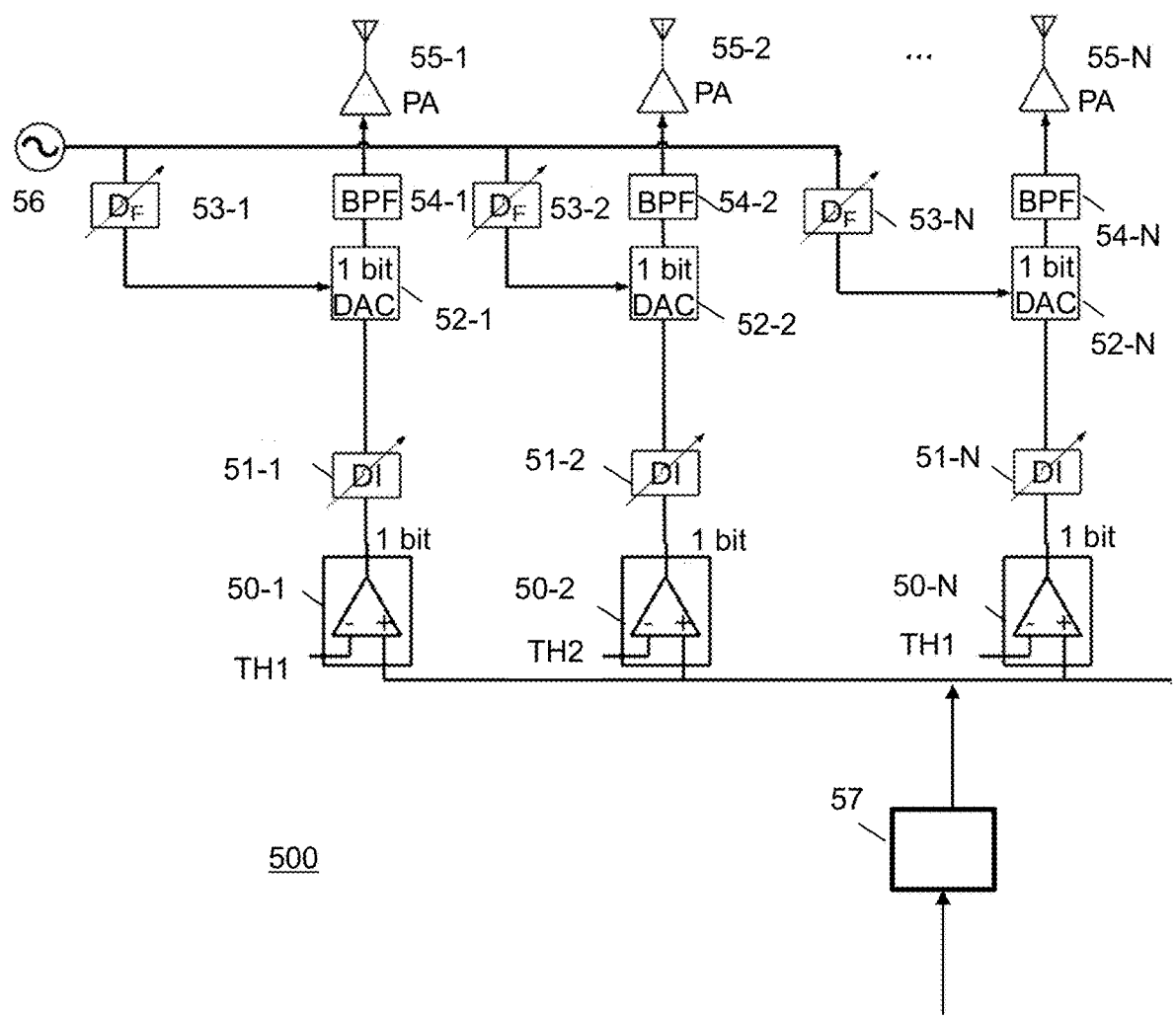
FIG. 5 illustrates the invention when the fraction delay is implemented by controlling the sample clocks of the DACs in accordance with some embodiments of the present invention.

Alternatively, the implementation of the sample fraction digital delay line that carries the sub sample fraction delay can be done by controlling the sampling time of the DACs as shown in FIG. 5 which is identical to FIG. 4 but with the sub sample fraction delay implemented in the analog domain using the clock 56 used to control DACs 53-1 to 53-N.

It is noted that the comparators and the one-bit DACs of FIG. 1 to FIG. 5 can be replaced with a multi-level comparator followed by a multi-level DAC, to reduce transmit quantization noise, as explained below.

Figure 6:
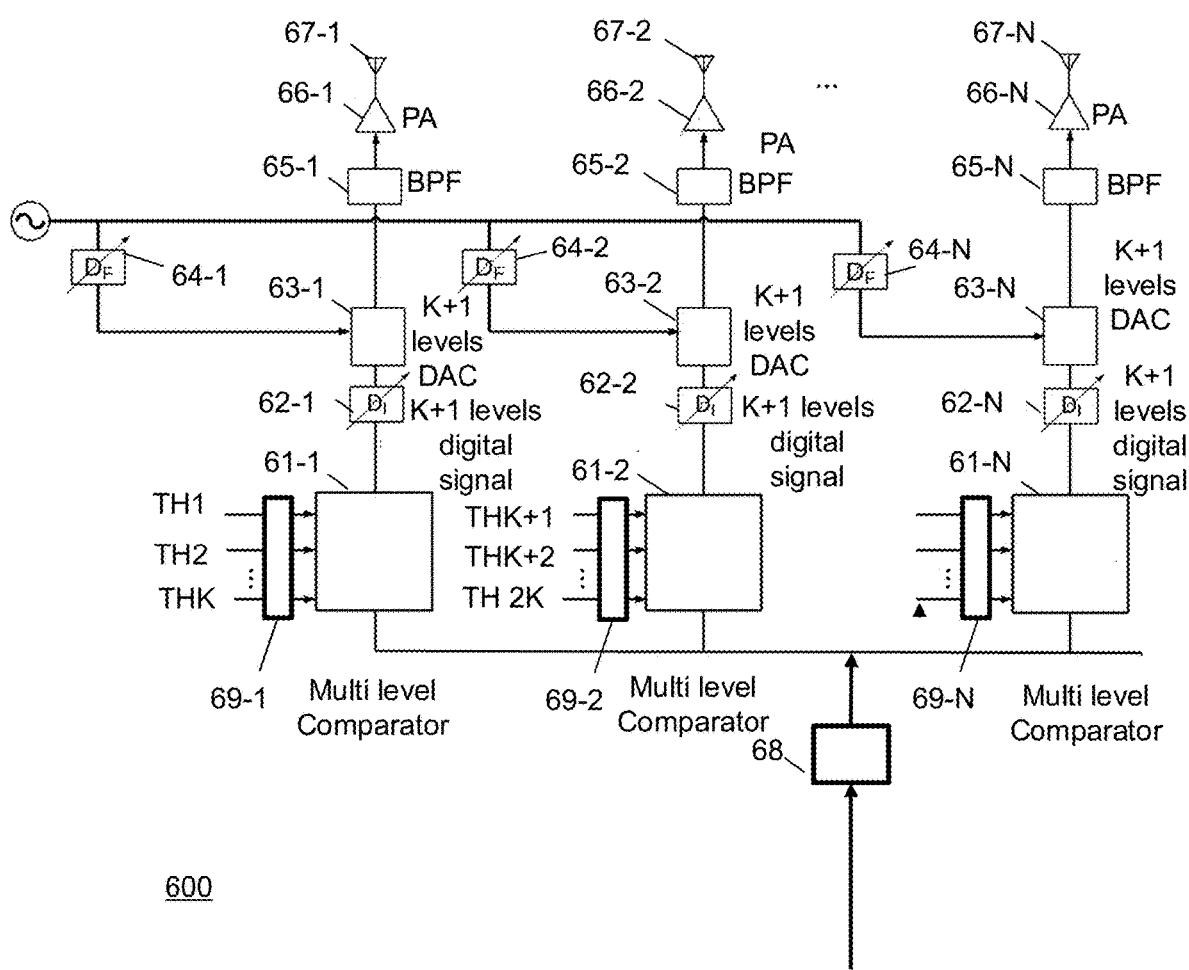
FIG. 6 illustrates the invention with multi-level DAC per antenna element in accordance with some embodiments of the present invention.

FIG. 6 is a circuit diagram showing circuit 600 which serves as a digital beamforming circuit in accordance with some embodiments of the present invention. In order to steer the antenna, different delays should be applied to each antenna element as explained in detail below. Circuit 600 includes an upconverter 68 configured to upconvert a digital signal from a baseband to RF band. It is then fed into comparators 61-1 to 61-N having respective thresholds $TH_1$-$TH_{N \times K}$ (Each multi level comparator has K thresholds so all together there are N×K thresholds). The outputs of comparators 61-1 to 61-N are fed into integer delay lines 62-1 to 62-N which are controlled independently in order to apply a different delay to each of the signals in the different channels controlling the respective antenna element. The outputs of delay lines 62-1 to 62-N are fed into respective multi-level DACs 63-1 to 63-N which may be used to reduce transmit quantization noise. Multi-level DACs 63-1 to 63-N are also controlled by a delayed clock via fraction delay lines 64-1 to 64-N whose analog outputs are feeding respective band pass filters BPFs 65-1 to 65-N which serve as a shaping filter to prevent sampling replicas from reaching power amplifiers 66-1 to 66-N before feeding antenna elements 67-1 to 67-N.

According to some embodiments of the present invention circuit 600 may further include one or more threshold permutation circuitries 69-1 to 69-N configured to periodically permutate the plurality of thresholds between the plurality of channels. This can be a single circuit or one per channel and may be implemented as explained below in detail.

Figure 7:
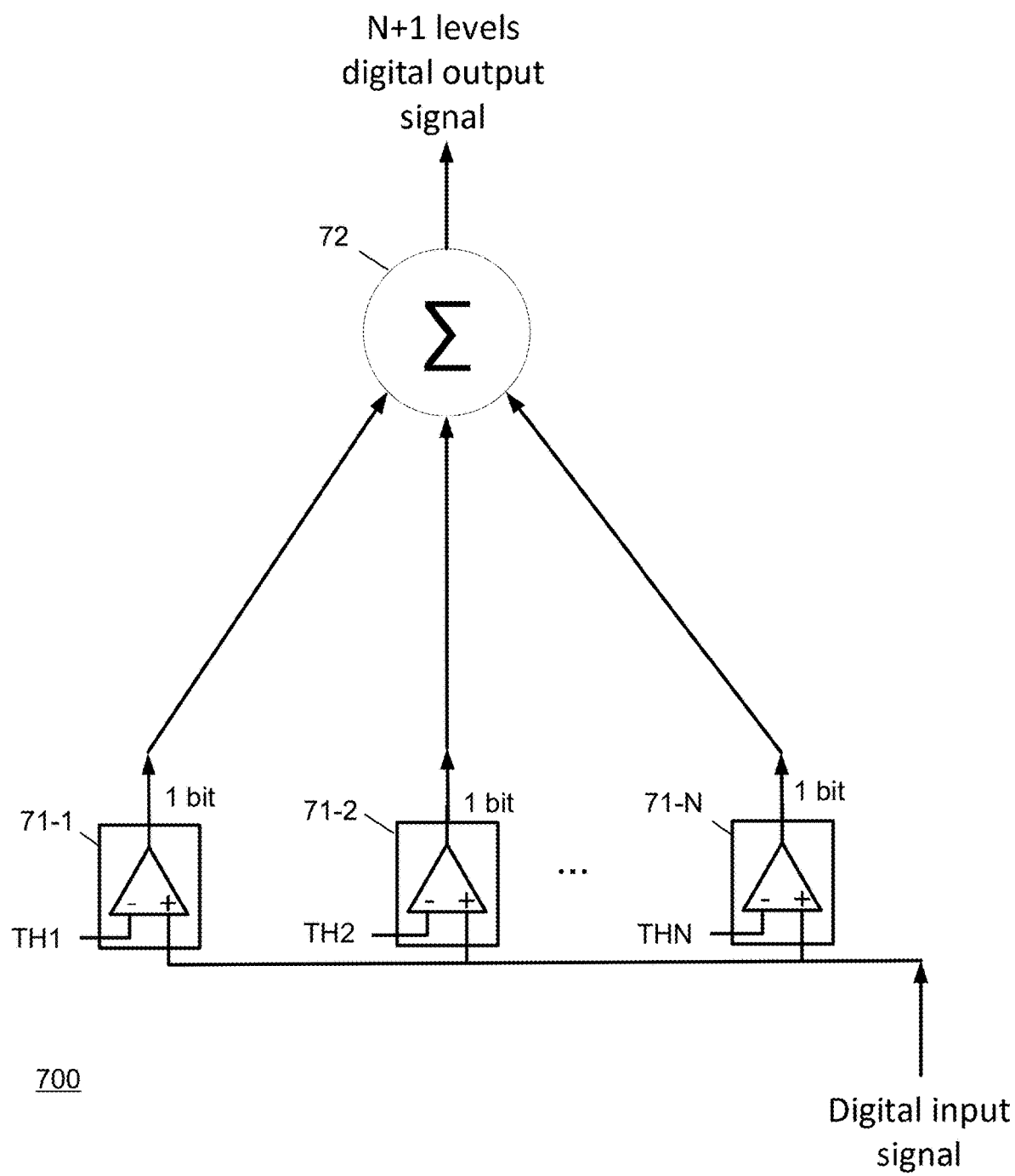
FIG. 7 illustrates an implementation of a multi-level DAC in accordance with some embodiments of the present invention.

FIG. 7 is a circuit diagram showing a circuit 700 which implements, according to a possible embodiment, a multi-level comparator shown in FIG. 6 using a plurality of 1 bit comparators 71-1 to 71-N with thresholds $TH_1$-$TH_N$, whose outputs are summed up by summation circuit 72 which outputs N+1 levels digital outputs signal.

It is noted that if the thresholds in FIG. 3 to FIG. 6 do not vary in time, some antenna elements may produce higher power (those with the lower thresholds) than others (those with the higher thresholds). This phenomenon is equivalent to tapering (changing antenna elements gains in order to control antenna radiation pattern) and will thus influence antenna radiation pattern.

In order avoid this phenomenon, the threshold can be permuted between the antenna elements in a high rate (permutation rate higher than the transmit signal bandwidth is recommended but lower rates are also applicable). These permutations can be carried out in various ways. For example, an LFSR (linear feedback shift register) can be used as shown in FIG. 8.

In this example, 2 k antenna elements are having 2 k different thresholds that are pseudo randomly permuted by a k-bit long LFSR per element where the 2 k LFSRs were initialized with 2 k different initial states and change in the same rate afterwards. In this example, the cycle of the permutation is 2 k clocks. If larger cycle is needed, a scheme as described in FIG. 9 can be used to increase the cycle length. The step of increasing the permutation cycle length by adding additional LFSR to control the initial states of the LFSR can be used again and again if needed (each time another LFSR and a LUT is added to control the initial sates of the bottom LFSR). Optionally, as seen in FIG. 10 a LUT can translate between the LFSR and the threshold itself. For example, when k=10 the LFSR output range is between 0 and 1023. If the input signal range to the DACs is between −511 to +512, and the required thresholds are −511 to +512 in steps of 1, the LUT (or a direct subtractor) will have −511 at address 0, −510 at address 1 and so on.

It should be noted that the Digital Delay Line (DDL) in FIG. 3 to FIG. 6 may be implemented in many ways. In principle, a sample level delay is easily implemented via a digital shift register while the sub sample delay can be implemented in various way known in the art. One efficient way, according to some embodiments of the present invention, is to approximate the sub sample delay by an interpolation between several neighbor samples.

Figure 11:
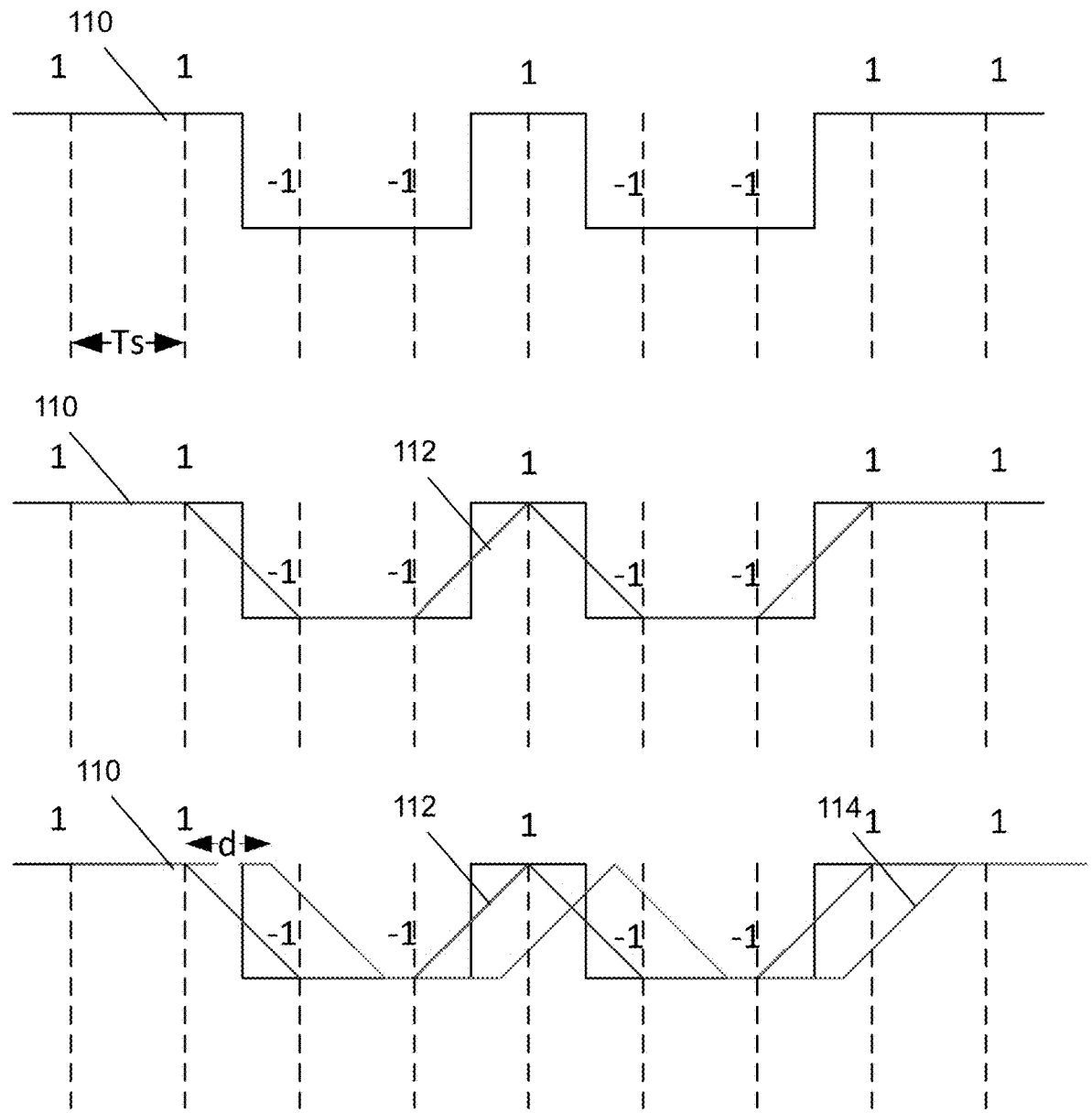
FIG. 11 illustrates a linear interpolated RF signal and its delayed version in accordance with some embodiments of the present invention.
Figure 12:
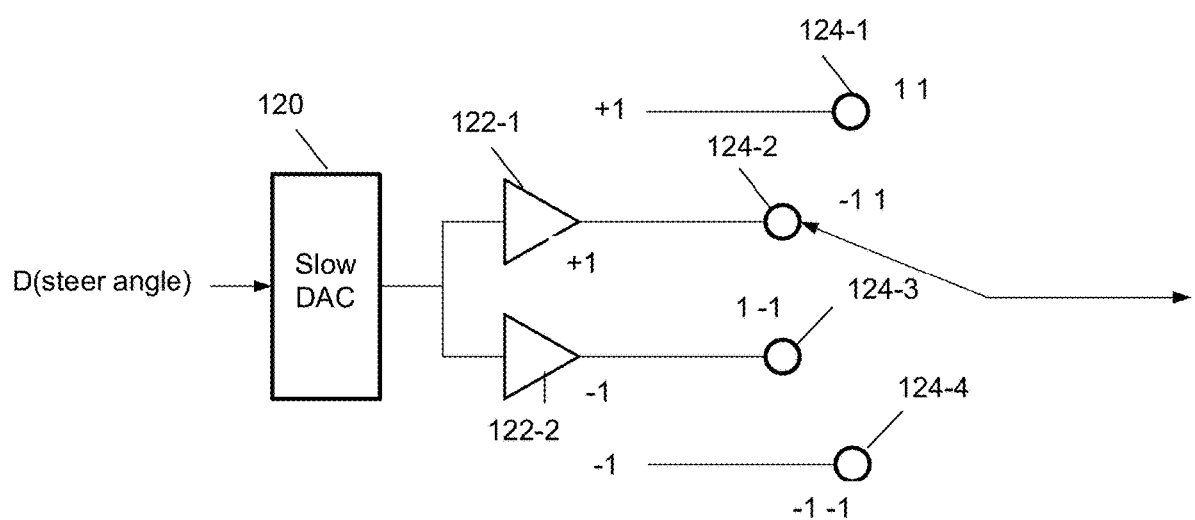
FIG. 12 illustrates implementation of interpolating delayed DAC in accordance with some embodiments of the present invention.

FIG. 11 shows a timing diagram 1100 that illustrates how the sub sample delay is implemented for a linear interpolation, as an example. The top part of FIG. 11 shows the sampled signal 110 of the one-bit DAC of FIG. 3. The time between samples is Ts and the sampling times are marked as vertical dashed lines. The middle part of FIG. 11 shows sampled 110 and a linear interpolation between the samples as 112. The lower part of FIG. 11 shows a delayed version of the linear interpolation, delayed by time d marked as 114. As can be seen in the lower part of FIG. 10, when d is fixed, the level of the alternating ramp line 114 at the sampling times (vertical dashed lines) can take only 4 level: ±1 and ±(1−2 d/Ts). Since the delay d is a function of the required steering angle, which changes in a rate that is much lower than the sampling rate, this scheme can be implemented by a slow high resolution DAC 120, two inverters 122-1 and 122-2 and one 4:1 selector (with switches 124-1 to 124-4) as shown in FIG. 12. As will be appreciated by one skilled in the art, higher order interpolation can be implemented in the same manner. For example, if three samples are used for interpolation (instead of two in the linear interpolation example), the output will have 8 possible levels which can be implemented with 3 slow DACs. Generally, when M samples are used for interpolation, 2(M−1)−1 slow DACs are needed.

Figure 13:
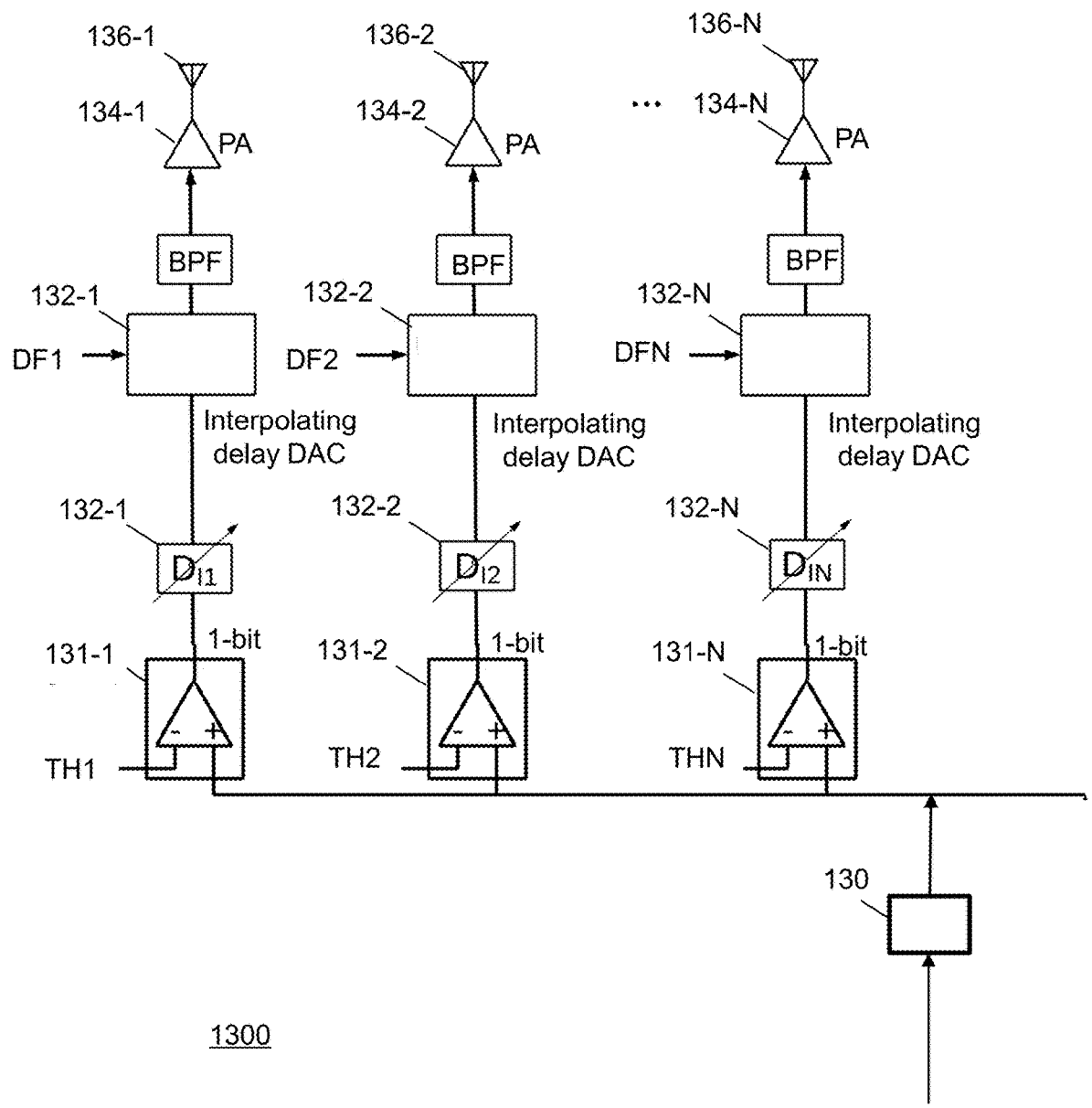
FIG. 13 illustrates the invention using the interpolating delayed DAC in accordance with some embodiments of the present invention.

FIG. 13 illustrates the antenna array according to the current invention when the interpolation DAC is used.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Figure 14:
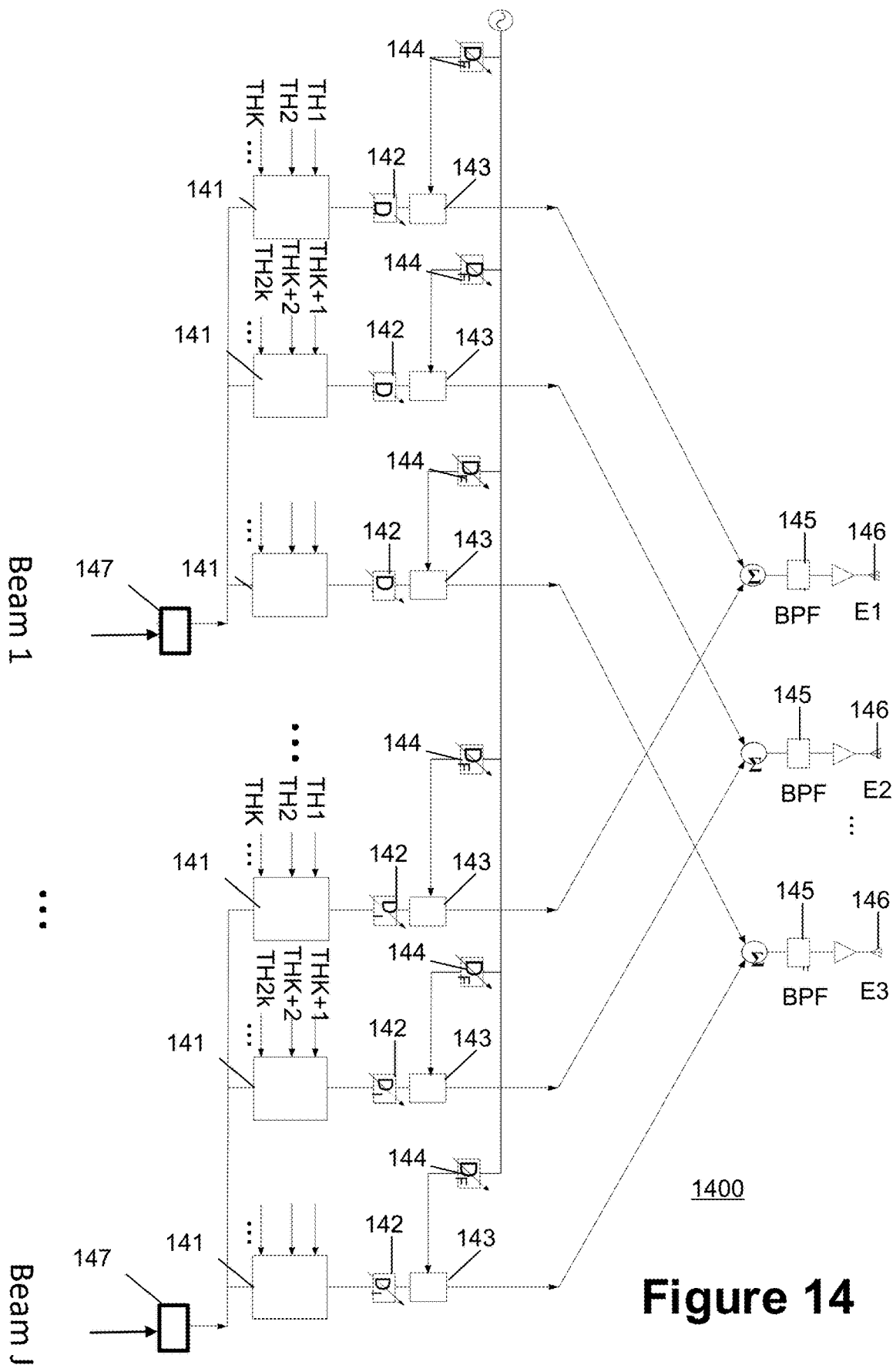
FIG. 14 illustrates an implementation of the invention in a multi-beam architecture in accordance with some embodiments of the present invention.

FIG. 14 illustrates an implementation of the invention in a multi-beam architecture in accordance with some embodiments of the present invention. Circuit 1400 which serves as a digital beamforming circuit in accordance with some embodiments of the present invention. In order to steer the antenna for a plurality of beams (e.g., beam 1 to beam J), different delays should be applied to each antenna element as explained in detail below. Circuit 1400 includes an upconverter 147 for each beam signal configured to upconvert a digital signal from a baseband to RF band. It is then fed into multi-level comparators 141s having respective thresholds $TH_1$-$TH_{N\times K}$ (Each multi level comparator has K threshold so all together there are N×K thresholds). The outputs of comparators 141s are fed into integer delay lines 142s which are controlled independently in order to apply a different delay to each of the signals in the different channels controlling the respective antenna element. The outputs of delay lines 142s are fed into respective multi-level DACs 143s which may be used to reduce transmit quantization noise. Multi-level DACs 143s are also controlled by a delayed clock via fraction delay lines 144s whose analog outputs are summed up by summation units and feeding respective band pass filters BPFs 145 which serve as shaping filters to prevent sampling replicas from reaching power amplifiers before feeding antenna elements 146s. Thus, a multi-beam transmitter is implemented by adding up the DACs outputs of all beams.

As will be appreciated by one skilled in the art, aspects of the present invention may be embodied as a system, method, or computer program product. Accordingly, aspects of the present invention may take the form of an entirely hardware embodiment (such as combination of any of: an integrated circuit (IC), discrete RF components and an RFIC), an entirely software embodiment (including firmware, resident software, micro-code, etc.) or an embodiment combining software and hardware aspects that may all generally be referred to herein as a "circuit", "module" or "system."

Furthermore, aspects of the present invention may take the form of a computer program product embodied in one or more computer readable medium(s) having computer readable program code embodied thereon.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment" "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting of" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A digital beamforming circuit comprising:
a plurality of channels, each channel having a digital input port configured to receive a digital input signal and an analog output port configured to feed an antenna element with an analog signal, wherein the plurality of channels forms an electronically steerable antenna (ESA), wherein each one of the plurality of channels comprises:
a comparator configured to compare the digital input signal with a respective one of a plurality of thresholds;
at least one multi-level digital-to-analog converter (DAC); and
at least one delay line circuitry configured to selectively apply a time delay to the signal along the channel, wherein the at least one delay line circuitry of each channel is separately controlled to apply a respective time delay, collectively enabling to steer a beam of the ESA.

2. The digital beamforming circuit according to claim 1, wherein the at least one multi-level DAC in each of the plurality of channels is configured to handle three or more levels.

3. The digital beamforming circuit according to claim 1, wherein the at least one delay line circuitry in each of the plurality of channels, comprises an integer delay time circuitry, implemented in the digital domain, and a fraction delay time circuitry, which is implemented either in an analog domain or the digital domain.

4. The digital beamforming circuit according to claim 1, wherein the at least one multi-level DAC in each of the plurality of channels comprises a sample clock, and wherein the sample time fraction circuitry in each of the plurality of channels is implemented by controlling the sample clock of the multi-level DAC.

5. The digital beamforming circuit according to claim 1, further comprising a threshold permutation circuitry configured to periodically permutate the plurality of thresholds between the plurality of channels.

6. The digital beamforming circuit according to claim 5, wherein the threshold permutation circuitry comprises a linear feedback shift register (LFSR).

7. The digital beamforming circuit according to claim 6, wherein the plurality of channels feeds $2^k$ or less antenna elements having $2^k$ different thresholds, wherein the LSFR in each of the plurality of channels is a k-bit long LFSR configured to pseudo randomly permute the thresholds, wherein the $2^k$ LFSRs are initialized with $2^k$ different initial states.

8. The digital beamforming circuit according to claim 7, wherein each one of the plurality of channels further comprises a look up table (LUT) configured to translate between an address presented by the LFSR and a value of the threshold.

9. The digital beamforming circuit according to claim 1, wherein the digital beamforming is a transmit path digital beamforming circuit which further comprises an upconverter that up converts the digital input signal from a baseband frequency value to a radio frequency (RF) value.

10. The digital beamforming circuit according to claim 1, wherein the digital beamforming is a transmit path digital beamforming circuit wherein each of the plurality of channels further comprises a band pass filter (BPF) at the output of the multi-levels DAC and a power amplifier at the output of the BPF, wherein the BPF serves as a shaping filter which prevents sampling replicas from reaching the power amplifier.

11. The digital beamforming circuit according to claim 1, wherein the at least one multi-level DAC and the at least one delay line circuitry are implanted as a single circuitry wherein the at least one delay line circuitry is configured to implement sub sample delays by interpolating the digital signal at the DAC.

12. A method comprising:
    providing a plurality of channels, each having a digital input port configured to receive a digital input signal and an analog output port configured to feed an antenna element with an analog signal, wherein the plurality of channels forms an electronically steerable antenna (ESA),
    comparing, at each one of the plurality of channels, the digital input signal with a respective one of a plurality of thresholds;
    converting, using a multi-level digital to analog converter (DAC) at each one of the plurality of channels, an output of said comparing, into an analog signal; and
    selectively applying a time delay to the digital and/or analog signal along each one of the plurality of channels, wherein the time delay at of each channel is separately controlled, to apply a respective time delay, collectively enabling to steer a beam of the ESA.

13. The method according to claim 12, wherein the multi-level DAC in each of the plurality of channels is configured to handle three or more levels.

14. The method according to claim 12, further comprising periodically permutating the plurality of thresholds between the plurality of channels.

* * * * *